Sept. 27, 1966    D. ALOIA    3,274,695
LEVEL AND RULE COMBINATION
Filed March 14, 1963

INVENTOR.
DOMINICK ALOIA
BY
William J. Ruano
his ATTORNEY

3,274,695
LEVEL AND RULE COMBINATION
Dominick Aloia, 112 Church St., Box 214,
Washington, Pa.
Filed Mar. 14, 1963, Ser. No. 265,208
1 Claim. (Cl. 33—215)

This invention relates to a level and rule combination for brick and stone masons and, more particularly, relates to a novel arrangement and construction of a level in said rule to facilitate plumbing and leveling of walls, corners, etc.

An outstanding disadvantage of conventional types of mason level and rule combinations is that a plurality of separate spirit levels are required, which are disposed at right angles for successively plumbing in two different vertical planes such as when trying to plumb a corner of a brick or stone wall. Such plumbing is effected only after tedious checking of one level, then the other, back and forth until both levels are centered. This often requires a considerable length of time, and very often accurate plumbing is not attained because of the great difficulty involved in centering and keeping centered, the bubbles of both levels. Also the bubbles of the glass-encased levels will at times steam up or fog up due to temperature changes so as to become invisible, also the bubbles will increase or decrease in length with temperature changes of the liquid introducing guess work in plumb reading. Moreover, if the vial or container of the spirit level becomes broken so as to lose the liquid, the plumb rule becomes useless.

Another disadvantage in the use of a wooden mason level is that the flat wooden surface will often get marred when laid onto the surface of a row of building blocks or bricks for the purpose of leveling of plumbing, also small particles of cement or projections from the blocks or bricks will make it impossible to lay the level absolutely flat against the surface, thereby slightly tilting the level and giving an inaccurate reading.

An object of the present invention is to provide a novel level and rule combination for brick and stone masons which will overcome the above named disadvantages and which embodies a plumbing or levelling construction which greatly facilitates and speeds up manipulation of the level to obtain a plumb condition, also which enables the level to be laid flat onto a row of bricks or stone blocks, that is, without tipping as a consequence of small projections or particles entrapped therebetween.

Another object is to provide a novel plumb rule which is clearly readable under widely varying temperatures and which will give plumb readings even if the vial or container of the plumb bob is broken and the liquid leaks out, since the liquid is not absolutely necessary for a plumb reading.

Other objects and advantages will become more apparent from a study of the following description taken with the accompanying drawing wherein.

Figure 1:
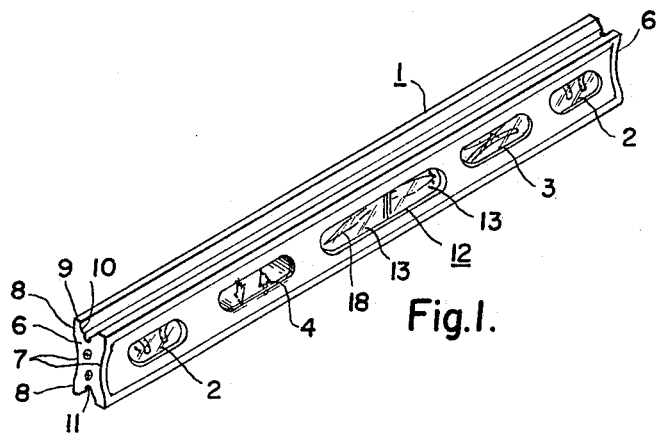
FIG. 1 is a perspective view of a mason's level and rule combination for brick and stone masons embodying the principles of the present invention.
Figure 2:
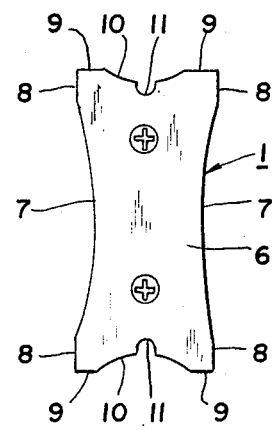
FIG. 2 is an enlarged, end view thereof.

Referring more particularly to FIGS. 1 and 2 of the drawing, numeral 1 generally denotes a level and rule combination, particularly useful for stone and brick masons, which is made essentially of wood and provided with slots 2, 3 and 4 which, if desired, although not necessary, may contain spirit levels, one extending transversely in slot 2 and the other, longitudinally in slot 3. Other arrangements of course may be used instead, such as the omission of one or more of the spirit levels.

As stated previously, the level and rule combination has a body portion made of wood (since metal is too cold to handle during winter), and in accordance with the present invention, the opposite major faces 7 are concave, as are the opposite edge surfaces, so that when the rule is laid down on a row of bricks or cement blocks for levelling, if there should be loose particles of cement thereon, the level will nevertheless lie perfectly flat in the top plane of the blocks since the arcuate surfaces 7, for example, will avoid direct contact with such cement particles which it confronts.

The edge portions of smaller width of the rule are provided with protective and reinforcing metallic coverings or shields 10, preferably of aluminum, and the end portions are covered by metallic shields 6. Shields 10 are provided with central rounded well portions 11 which may be used as guides when plumbing the corners of a brick or stone wall. The rounded configuration of the well portions prevents adherence of cement as would occur in sharp corners.

When such plumbing is done, it is, of course, necessary to be guided by the reading of a level or plumbing device. Such device, which embodies an important part of the present invention, is generally indicated by numeral 12 and fits into a conventional slot formed in the center or in other slots of the rule.

Figure 3:
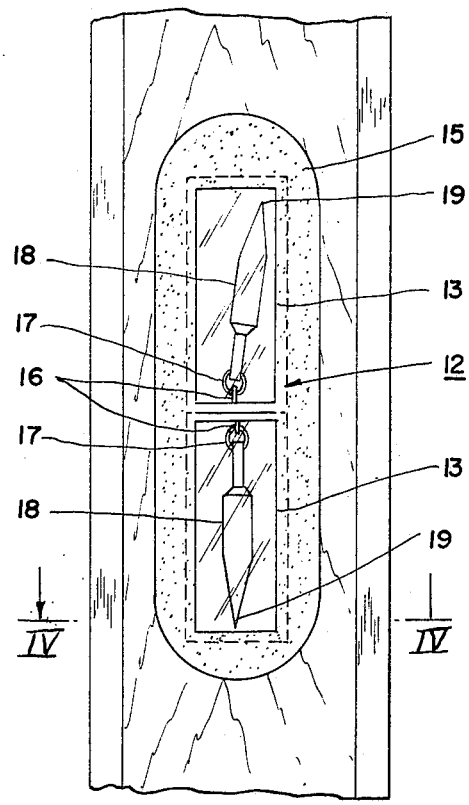
FIG. 3 is an enlarged, fragmentary, plan view of the novel levelling construction shown in FIG. 1, to facilitate plumbing and embodying the principles of the present invention; and, FIG. 4 is a cross-sectional view taken along line IV—IV of FIG. 3.
Figure 4:
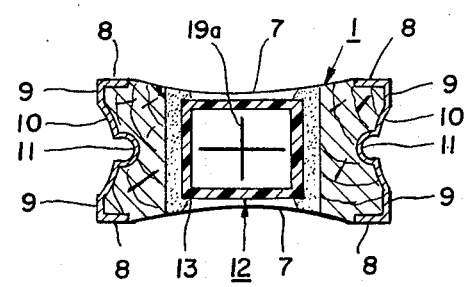

The levelling and plumbing device 12, best shown in FIG. 3, comprises a body portion 15 of plaster of Paris, aluminum or any other suitable material to form a tight fit in the slot of the rule and is provided with a pair of glass or transparent plastic vials or enclosures 13 forming completely enclosed and sealed chambers whose contents are readily observed through window portions on opposite sides of the level. In each chamber 13 there is provided a plumb bob 18 suspended from one end wall of the chamber by links 16 and 17 or by other means for universal suspension, such as a ball joint. Contained within chamber 13 there is preferably provided a viscous liquid, such as glycerine or glycerine and water, so as to damp the movements of the plumb bobs 18 when the rule is being manipulated into plumb position. The index points 19 of the plumb bobs will cooperate with cross hairs 19a formed on the extreme end walls of chambers 13, the cross hairs 19a being preferably black on a white background, as shown. The index points 19 or the entire plumb bobs and cross hairs 19a may be made of luminous material to facilitate reading in dark corners etc.

The main purpose for providing two plumb bobs in back to back relationship is to enable plumbing regardless of which end of the rule extends upwardly. As shown in FIG. 3, the lowermost plumb bob 18 is utilized when plumbing a vertical wall or corner.

The index or pointed end 19 of plumb bob 18 can be made to point to the point of intersection of cross hairs 19a with great ease and can be done in an amazingly short time. Thus, plumbing a corner of a building, which is usually a difficult and time consuming process, can be done instantly while the corner is contained within well portions 11 along the smaller edges of the rule. In short, it eliminates the disadvantage from the use of two spirit levels to plumb in one vertical plane by one level, then at another vertical plane at right angles thereto by the other level and finally plumbing the intersection of these planes, that is, the corner. By the present invention the corner may be directly plumbed without the necessity of plumbing both walls forming it.

Of course, one of the plumb bobs may be omitted if the same end of the rule will always be lowermost when plumbing or levelling.

In order to permit levelling as well as plumbing, another pair of plumb bobs may be placed in slot 4 in either back to back relationship as shown in FIG. 3, but preferably in side by side relationship, extending in opposite directions, as shown in FIG. 1 because of the limited available space.

While the present level has been described as being especially useful as a mason's level, it also may be useful for other types of levels, such as a torpedo shaped level used by plumbers and steelworkers. For such use, shields 10 and 6 may be made of magnetic material, such as iron, to permit magnetic attraction and support of the rule on iron pipes, steel beams, etc.

While I have illustrated and described a single specific embodiment of my invention, it will be understood that this is by way of illustration only, and that various changes and modifications may be made within the contemplation of my invention and within the scope of the following claim.

I claim:

In a brick mason type of level and rule combination having a longitudinal slot which is relatively short compared to the length of the level and rule combination, a longitudinally extending container within said slot, a plumbing device in said container comprising a plumb bob universally suspended from one end of said container, cross-hairs formed at the other end of said container and cooperable with said plumb bob, and liquid in said container for damping movements of said plumb bob, whereby inclinations of said rule in any direction radially of the longitudinal direction may be detected, said rule having a wooden body portion provided with concave opposed outer surfaces of greatest width, edge surfaces of smaller width which are also concave and provided with central well portions extending along the length of the level and being covered by metallic shields for use as guides for plumbing corners of buildings.

References Cited by the Examiner

UNITED STATES PATENTS

| | | | |
|---|---|---|---|
| 474,861 | 5/1892 | Rush | 33—220 X |
| 1,265,468 | 5/1918 | Madsen | 33—215.2 |
| 1,284,421 | 11/1918 | Morris | 33—206 |
| 1,302,580 | 5/1919 | Nelson | 33—206 |
| 1,541,455 | 6/1925 | White | 33—215.1 |
| 1,738,791 | 12/1929 | Ober | 33—211 |
| 1,861,692 | 6/1932 | Gerdes | 33—220 |
| 2,353,586 | 7/1944 | Reininger | 33—206 |
| 2,512,654 | 6/1950 | Kennedy | 33—85 |
| 2,554,133 | 5/1951 | Von Arx | 33—215.2 |
| 2,635,350 | 4/1953 | Bettega | 33—207 |
| 2,645,018 | 7/1953 | Waddell | 33—85 |

LEONARD FORMAN, *Primary Examiner.*

ISAAC LISANN, *Examiner.*

J. H. BARKSDALE, LLOYD V. ANDERSON,
*Assistant Examiners.*